Nov. 23, 1965 C. J. CISLO 3,219,090
WHEEL
Filed Sept. 4, 1963
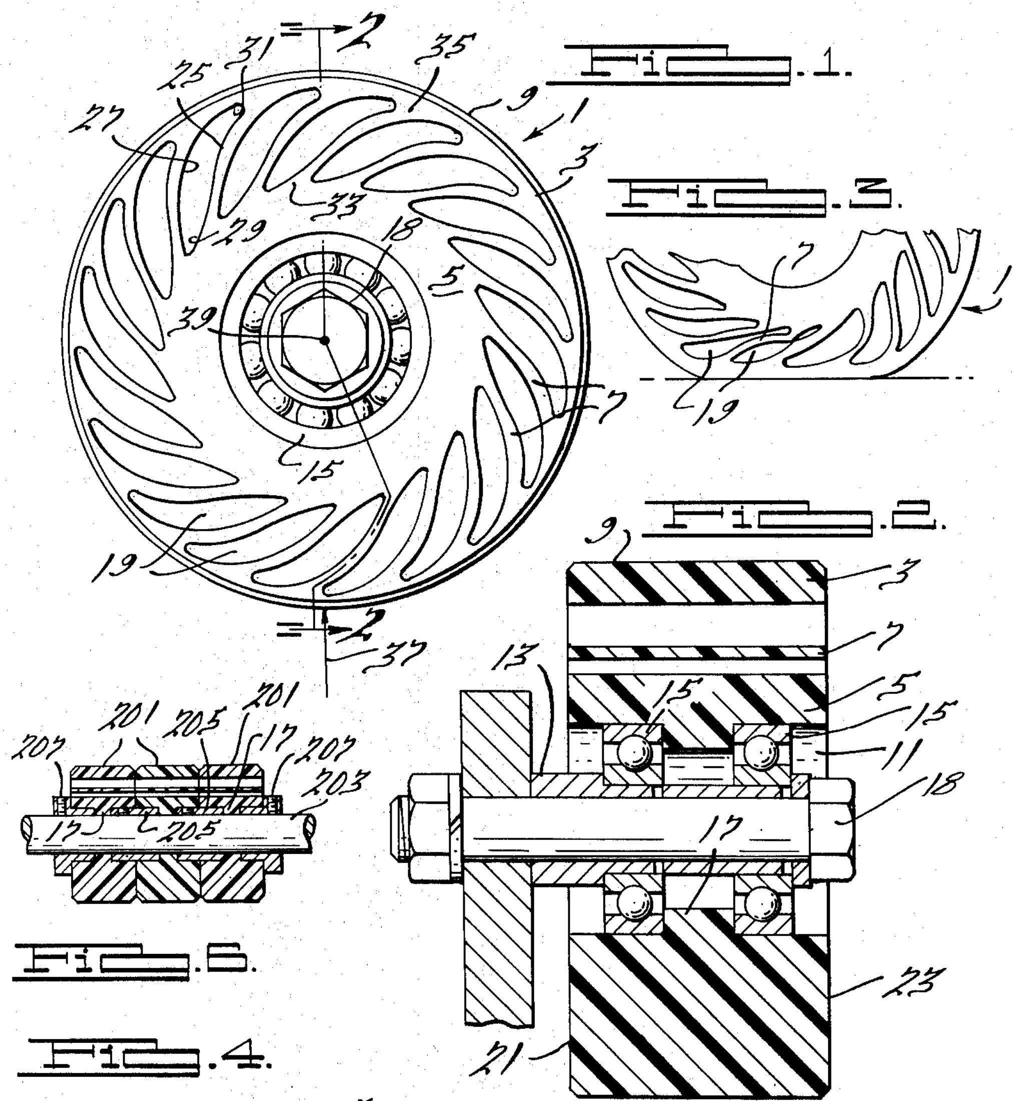
FIG. 4.
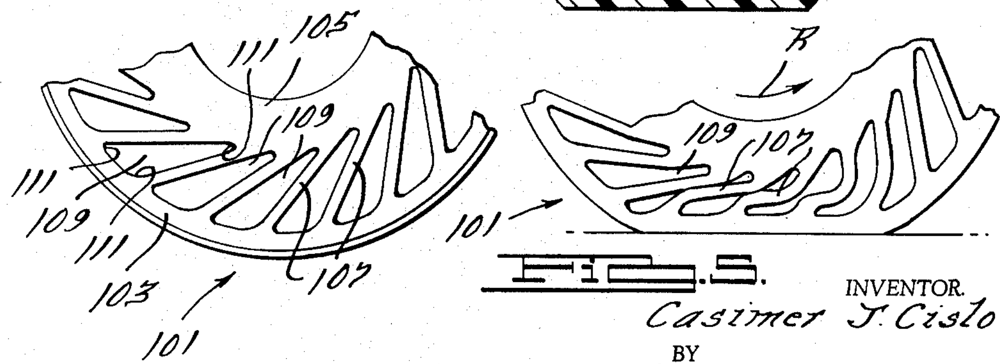
INVENTOR.
Casimer J. Cislo
BY
Harness, Dickey & Pierce
ATTORNEYS.

United States Patent Office 3,219,090

Patented Nov. 23, 1965

3,219,090

WHEEL

Casimer J. Cislo, Southfield, Mich., assignor to Air-Flex Corporation, Detroit, Mich., a corporation of Michigan

Filed Sept. 4, 1963, Ser. No. 306,565

7 Claims. (Cl. 152—7)

This invention relates to resilient wheels and the like, such as resilient rollers and cylinders, and, in particular, to non-pneumatic wheels of monolithic construction.

It is an object of the invention to provide a resilient wheel that has superior durability and vibration damping characteristics that eminently qualify it for heavy duty usage, such as for cushion rolls in sheet metal panel feeding apparatus.

Another object of the invention is to provide a resilient wheel which is self-cooling and self-cleaning.

A further object of the invention is to provide a resilient wheel in which the amount of self cooling is proportional to the load.

An additional object of the invention is to provide resilient wheel incorporating principles of design such that the resiliency of the wheel may be readily varied and controlled.

A further object of the invention is to provide a resilient wheel design that incorporates means for controlling or varying the compliance of the wheel to irregular surfaces.

Another additional object of the invention is to provide a resilient wheel having spokes that function as cantilevers so that compliance of the wheel may be varied by variation of spoke angle, spoke length, and spoke thickness.

Another object is to provide a total resilient wheel, including a hub, formed of a body of urethane elastomer.

Another object of the invention is to provide a wheel structure such that the same wheel can be used on a solid shaft mounting, a sleeve shaft mounting, or a gang mounting.

A resilient wheel according to the invention comprises a one-piece body of an elastomer, preferably urethane. The body has an outer periphery or rim which is connected to a central hub portion by diagonal or radially extending, but non-radial, cantilever spoke sections of special orientation and contour. The spoke sections are shaped to provide for optimum surface compliance and localized elastic deformation and damping characteristics of that portion of the wheel under load. The wheel body is open between the spoke sections and these openings provide self-cleaning cooling chambers through which deformation induces air to flow in an amount proportional to the load and the need for cooling.

The invention is illustrated in the accompanying drawings in which:

FIGURE 1 is a side elevation of a resilient wheel embodying the invention under no load;

FIG. 2 is a cross section along line 2—2 of FIG. 1;

FIG. 3 is a partial side elevation showing the wheel of FIG. 1 under heavy load;

FIG. 4 is a partial side elevation of another wheel embodying the invention under no load;

FIG. 5 is a partial side elevation of the wheel of FIG. 4 under heavy load; and

FIG. 6 shows schematically a gang mounting of the wheels of this invention.

FIGS. 1–3 show a resilient wheel 1 that is preferably molded or extruded from the elastomer urethane. The wheel comprises an outer, annular rim section 3, a central hub section 5, and a plurality of radially extending spoke sections 7 that resiliently support the rim 3 on the hub 5. The rim 3 has an outer, peripheral surface

9 which engages the surface on which the wheel is to ride or exert force. The hub 5 has a central opening 11 to receive the axle 13 on which the wheel is mounted. If the wheel is made of urethane, it will have sufficient strength to take axial thrust of the two bearing sets 15 on opposite sides of an integral reduced diameter collar section 17 formed at the mid-section of opening 11. A suitable mounting assembly, such as illustrated at 18, rotatably secures the wheel 1 and bearings 15 in position on the axle 13.

The spokes 7 are formed as membranes or webs in the wheel body between adjacent, angularly spaced, radially directed openings 19 that are formed to extend through the full width of the wheel from one side 21 to the other 23. The openings 19 are identical around the wheel and each has a convex side 25 of rather shallow curvature, and a concave side 27 of substantially more curvature. The two sides are curved to blend together in an inner end portion 29 and an outer end portion 31 for the opening 19. The openings 19 are shaped so that the various spokes 7 which they define are of substantially uniform thickness throughout their length except at their inner and outer ends 33 and 35 where they gradually thicken as they blend into the hub 5 and the rim 3, respectively.

As is well known, the applied load on the surface of a wheel (such as surface 9) acts along a line 37 that passes through the center (such as 39) of the wheel, i.e., along a true radius. It is essential to the present invention that the openings 19 are formed so that the spokes are not true radii of the wheel but instead extend at angles to true radii. The larger the slope of the spokes (angle with the radius) the softer the wheel. Thus, by changing the slope a wheel can be designed to be harder or softer and more compliant. Likewise, by making the spokes 7 or the rim 3 thicker or thinner the wheel can be made harder or softer. The wheel can also be made more compliant to surface conditions (softer) by making the spokes longer. Additionally, the durometer of the urethane or elastomer material can be varied to vary the deflection rate of the wheel.

FIG. 3 shows somewhat schematically the wheel 1 under a heavy load. It will be noted that the openings 19 change in shape as flattening of the rim 3 progresses around the periphery and is yieldably resisted by the spokes 7. This change in shape creates a pumping action that causes air to flow through the wheel to provide a cooling effect.

FIGS. 4 and 5 show a modified spoke and opening construction in a wheel 101. The rim 103 is connected to the hub 105 by spokes 107. The spokes 107 are straight and consequently the openings 109 between them are shaped like obtuse triangles having fillets 111 in the corners to avoid stress concentrations. Since the openings 109 are larger adjacent the rim than the openings 19 in FIGS. 1–3, the rim 103 is somewhat more compliant to surface irregularities than the rim 3. From the standpoint of compliance, triangular openings with the base or maximum width portion located closest to the rim provide an optimum design. FIG. 5 shows how the spokes 107 deflect and how the openings 109 change in shape under heavy load. The arrow R in FIG. 5 shows the preferred direction of rotation for the wheel if the application requires only one direction of wheel rotation.

The flat side faces and internal construction of the wheels make them ideally adapted for use in gang mountings. For example, in FIG. 6 the wheels 201 are gang mounted on a shaft 203. In this particular arrangement there is a solid shaft mounting and the diameters 17 of the wheels fit on the shaft. Bushings or sleeves 205 may be mounted on the shaft to fill the enlarged diameters 11 of adjacent wheels. Suitable means, such as gland nut 207, are provided to apply an axial force to the wheels so that the flat side faces are all in tight, non-slipping engagement with each other so all wheels rotate as a unit. In some cases the bushings 205 are not needed on the interior wheels because the tight engagement of the side faces of the wheels furnishes sufficient support against radial distortion of the diameters 11.

In use, the spokes 7 or 107 readily flex to permit the outside surface of the wheel to flatten or comply with the surface with which the wheel is engaged. The spokes have a peculiar overcenter flexing motion during rotation of the wheel which absorbs energy and dampens or cushions vibrations as well as changes the volumes of chambers 19 or 109 to provide a pumping action.

As already indicated, the deformability of the wheel for a given urethane durometer can be readily controlled by variation of the spoke angle, length, spacing, and thickness. Further variation can be obtained by making the spokes of non-uniform thickness, e.g., tapered in thickness. The wheel is made softer by increasing the spoke angle, length, or spacing while it is made harder by increasing spoke thickness. Increasing the thickness of the rim also makes the wheel harder and less compliant, as does increasing the number of spokes per wheel. Thus, a wide range of control over wheel properties is provided by the present design. Angled spokes could be used to cause contact of one spoke with another under high impact or shock loads resulting in high hysteresis and damping due to one spoke chafing against another plus the natural high hysteresis of the urethane material. Heat is carried away by the pumping action. This effect can be obtained also with non-uniform thickness spokes.

Variations in the structure shown may be made without departing from the spirit and scope of the invention.

I claim:

1. A resilient wheel comprising a one piece nonmetallic body including a hub defining an axis of rotation, an integral rim having an other rolling surface, and a large number of integral independent bendable spokes serving as the only means interconnecting said hub and said rim, all of said spokes extending at an angle to radii extending from said axis to said outer rolling surface whereby said spokes bend as cantilevers when load is applied to flatten said wheel.

2. A resilient wheel as set forth in claim 1 wherein the wheel is formed from urethane.

3. A resilient wheel comprising a hub defining an axis of rotation, a rim having an outer periphery defining a rolling surface, and a plurality of circumferentially spaced independent spokes interconnecting said hub to said rim, said rim and said spokes being readily deformable, said spokes being disposed at an angle to the radii of said wheel for compliance of said wheel by cantilever bending of said spokes and flattening of said rolling surface of said rim under the influence of radial loads upon said wheel through said axis and said rolling surface.

4. A resilient wheel as set forth in claim 3 wherein the wheel is a unitary nonmetallic structure.

5. A resilient wheel as set forth in claim 4 wherein the wheel is formed from urethane.

6. A resilient wheel as set forth in claim 2 wherein the side faces of the wheel including at least a portion of the hub, spokes, and rim are flat for gang mounting of a plurality of wheels in tight side face-to-face engagement.

7. A wheel as set forth in claim 2 wherein the hub has an opening extending through it of stepped diameters, one of said diameters being smaller than the others and formed by an integral collar portion having radial thrust shoulders facing axially outwardly at each side thereof, said shoulders being formed by said collar portion and adjacent portions of said opening having larger diameters than the diameter defined by said collar portion.

References Cited by the Examiner

UNITED STATES PATENTS

| | | | |
|---|---|---|---|
| 690,872 | 1/1902 | Peck | 152—12 |
| 1,943,881 | 1/1934 | Ware | 152—7 X |
| 2,572,276 | 10/1951 | Moe | 152—7 |
| 2,603,267 | 7/1952 | Simpson | 152—7 |
| 2,902,072 | 9/1959 | Reuter. | |
| 2,978,277 | 4/1961 | Gaudry. | |

FOREIGN PATENTS

| | | |
|---|---|---|
| 593,855 | 3/1960 | Canada. |

ARTHUR L. LA POINT, *Primary Examiner.*

PHILIP ARNOLD, *Examiner.*